United States Patent [19]

Takeda et al.

[11] Patent Number: 5,303,072
[45] Date of Patent: Apr. 12, 1994

[54] LIQUID CRYSTAL DISPLAY DEVICE

[75] Inventors: Mamoru Takeda; Sadayoshi Hotta, both of Hirakata; Ichiro Yamashita, Katano; Tatsuhiko Tamura, Neyagawa; Yoneharu Takubo, Toyonaka, all of Japan

[73] Assignee: Matsushita Electric Industrial Co., Ltd., Osaka, Japan

[21] Appl. No.: 722,550

[22] Filed: Jun. 26, 1991

[51] Int. Cl.$^5$ .............................. G02F 1/133
[52] U.S. Cl. ........................ 359/59; 359/58
[58] Field of Search ................ 359/54, 59, 58; 340/784, 719

[56] References Cited

U.S. PATENT DOCUMENTS 4,890,097 12/1989 Yamashita et al. ............ 359/59
4,936,656 6/1990 Yamashita et al. ............ 359/54

FOREIGN PATENT DOCUMENTS 0182645  5/1986 European Pat. Off. ........... 359/59
028390A2 9/1988 European Pat. Off. .
0338822A3 10/1989 European Pat. Off. .
2-050132 5/1990 Japan .

OTHER PUBLICATIONS

"Capacitively-coupled TFT/LCD with minimized parasitic effects" IBM, vol. 31, No. 3, Aug. 1988, pp. 94-97.

Primary Examiner—William L. Sikes
Assistant Examiner—Huy Mai
Attorney, Agent, or Firm—Wenderoth, Lind & Ponack

[57] ABSTRACT

An improved arrangement of a liquid crystal display device is provided in which the redundancy of a known but unwanted TFT (thin film transistor) defect is suppressed so that the yield per finished liquid crystal display device product can be increased without deterioration in the picture quality. Each pixel of the liquid crystal display device arranged at an intersection of one of scanning lines and one of signal lines is provided with two or three TFTs and also, a storage capacitor which is formed of a portion of a gate insulating layer and is sandwiched between its electrode and a preceding scanning line in the previous row using no extra masking procedure. The source, drain and gate electrodes of both the first and third TFTs are respectively coupled to the same signal line, the electrode of the same pixel and the adjacent scanning lines. The gate, source and drain electrodes of the second TFT are respectively coupled to the same scanning line to which the gate electrode of the first TFT is coupled, the electrode of the same pixel and the electrode of a succeeding pixel provided on the opposite side of the scanning line with respect to the same pixel. The arrangement also has a scanning driver circuit capable of activating two scanning lines at the same time for a sequential one-by-one scanning operation, whereby no fault in a reproduced image will be perceived in spite of the presence of a defective TFT.

2 Claims, 7 Drawing Sheets

LIQUID CRYSTAL DISPLAY DEVICE

BACKGROUND OF THE INVENTION

1. Field of the Invention

The present invention relates to a liquid crystal display device active components.

1. Description of the Prior Art

Figure 3:
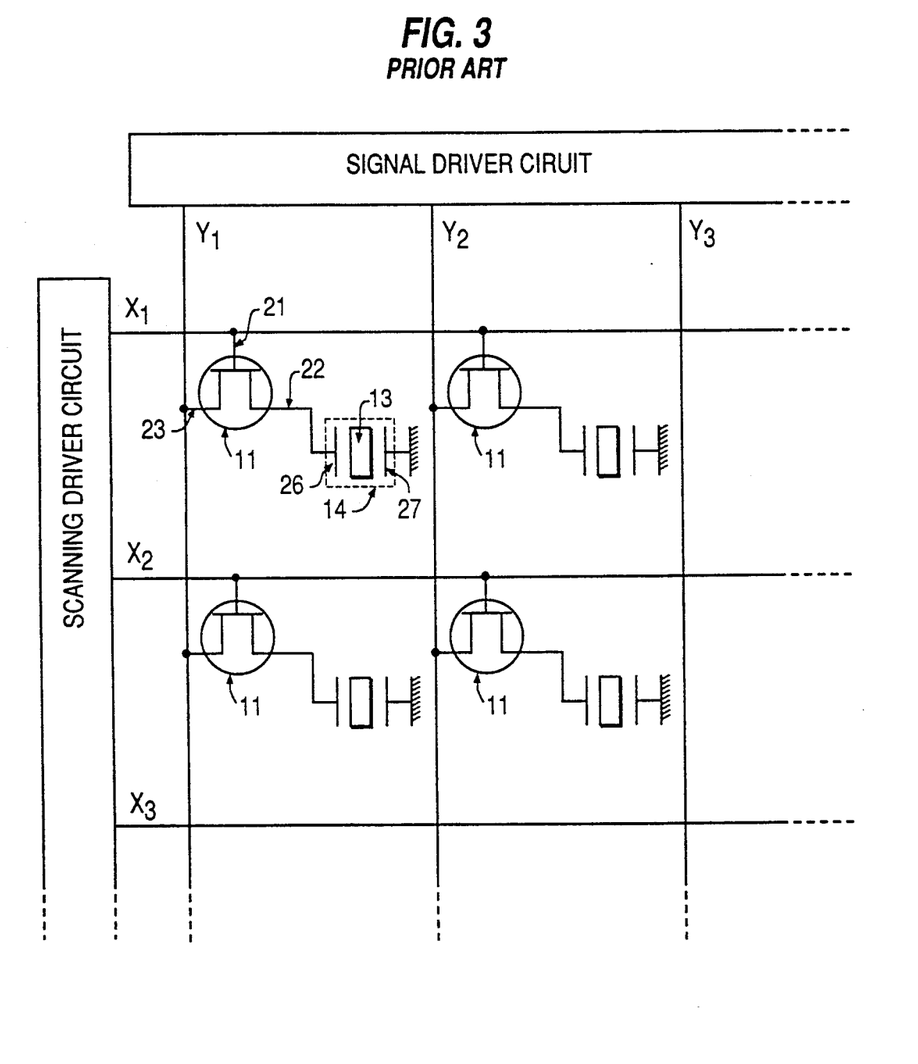
FIG. 3 is an equivalent circuit diagram of a prior art liquid crystal display device.
Figure 4:
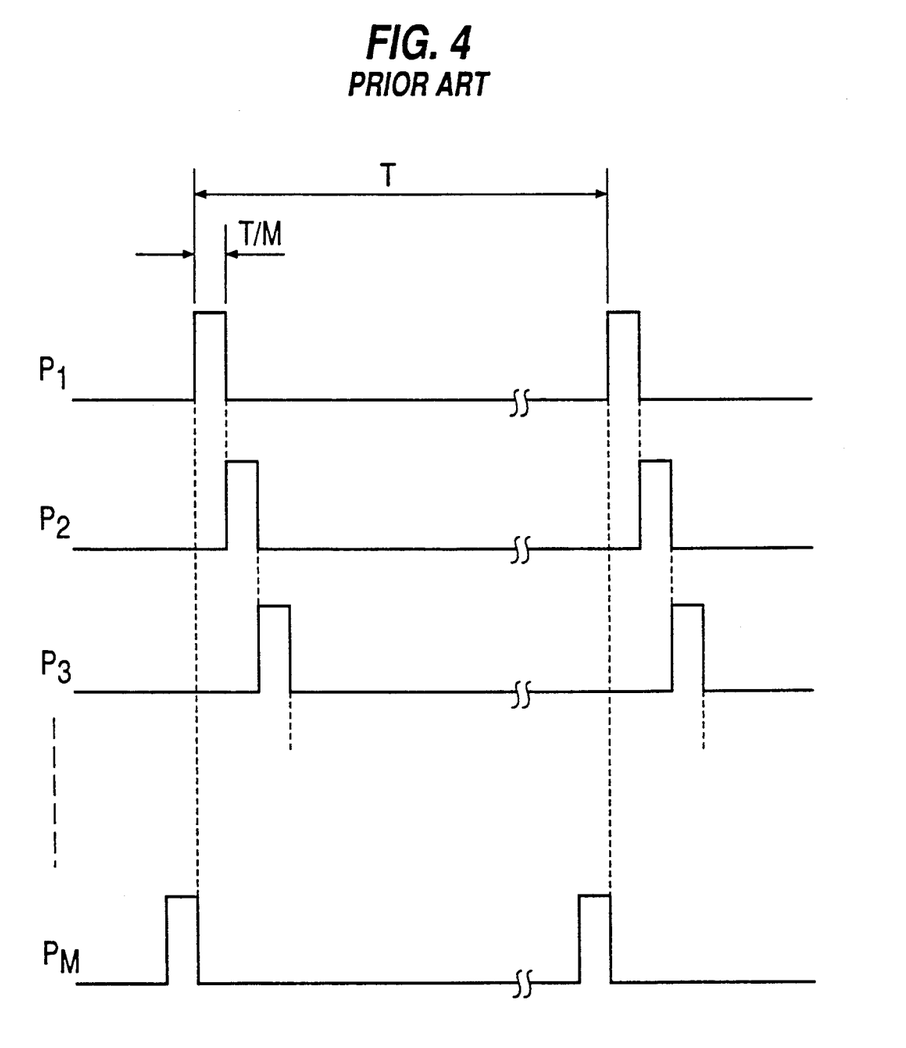
FIG. 4 is a waveform diagram of selective pulses used in the prior art device.

A known liquid crystal display device is provided such an array of thin film transistors (abbreviated to "TFT" hereinafter) as shown in FIG. 3 which is described in more detail in Japanese Laid-open Patent Publication 60-151615 (1985). The TFT array of the liquid crystal display device comprises a plurality of scanning lines X1 to XM (where M is the total number of the scanning lines), a plurality of signal lines Y1 to YN (where N is the total number of the signal lines), a plurality of TFTs 11, and pixel electrodes 26. The scanning lines X1 to XM are coupled to gate electrodes 21 of their respective TFTs 11 and the signal lines Y1 to YN are coupled to source electrodes 23 of the same. The drain electrode 22 of each TFT 11 is coupled to a pixel electrode 26. A liquid crystal material 13 is sandwiched between the pixel electrode 26 and its opposite electrode 27 constituting a display pixel 14. The display pixel 14 acts as a capacitor in an equivalent circuit and if needed, may be accompanied by a storage capacitor coupled in parallel. The operation of the TFTs 11 will now be described referring to FIG. 3. In operation, such selective pulses P1, P2, P3, . . . as shown in FIG. 4 are applied by a scanning driver circuit to the scanning lines X1, X2, X3, . . . respectively. As shown in FIG. 4, T represents a frame period while M is the number of scanning lines. For example, when only a pulse P1 is fed, the scanning line X1 becomes activated selectively (while the other scanning lines remain unselected) thus allowing each of the TFTs 11 coupled thereto to communicate between its source and the drain and draw a corresponding signal voltage from a signal driver circuit to actuate its pixel. When X1 is unselected, its TFTs become disconnected and hold their signal voltages applied to the pixels until X1 is again selected in the following frame. As understood, the liquid crystal display device with a TFT array is capable of feeding desired signal voltages to corresponding pixels accurately and respectively thus ensuring display of a picture which exhibits less crosstalk and a high contrast ratio.

Figure 6:
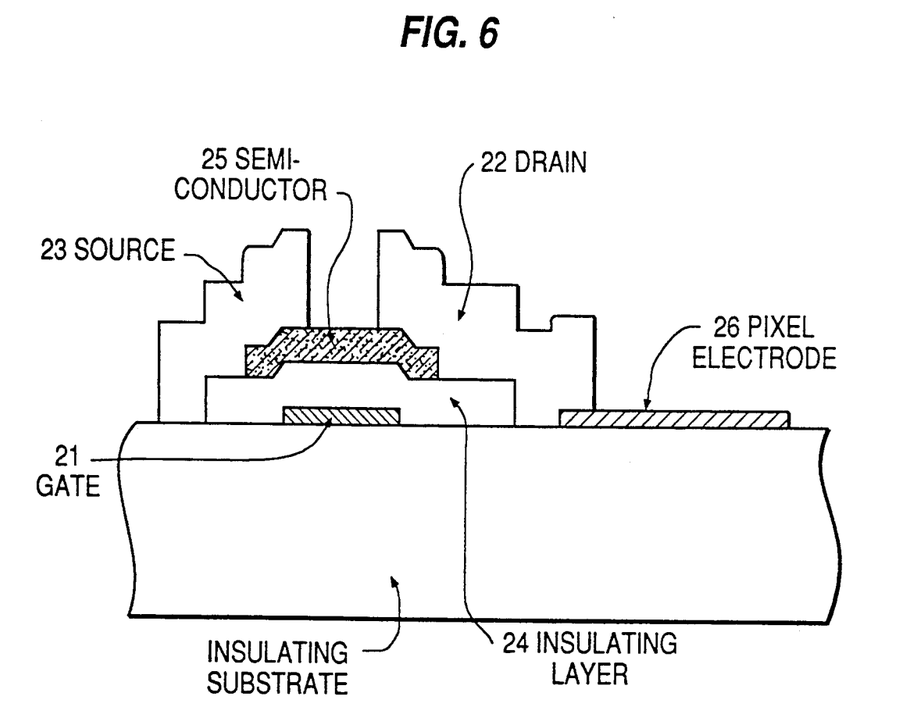
FIG. 6 is a cross sectional view of a typical TFT.

In production, it is however difficult to have a considerable number of finished TFTs qualified as "good" products, particularly when the number of their scanning and signal lines is increased. Each TFT is constructed in a layer arrangement in which the gate 21, the source 23, and the drain 22 are separated from each other by at least one insulating layer 24, as best shown in the cross sectional view of FIG. 6. Hence, during a procedure of a pinhole forming or other steps, any incidental error tends to cause a shortcircuit between the gate and the source. Accordingly, the shortcircuit between the gate and source electrodes will result in a crucial malfunction of a series of TFTs aligned along the scanning line coupled to the defective TFT which is known as a "line defect". Also, when the source electrode 23 is shortcircuited to the drain electrode 22, their corresponding liquid crystal, cell fails to hold a normal signal voltage thus causing a "point defect".

Figure 7:
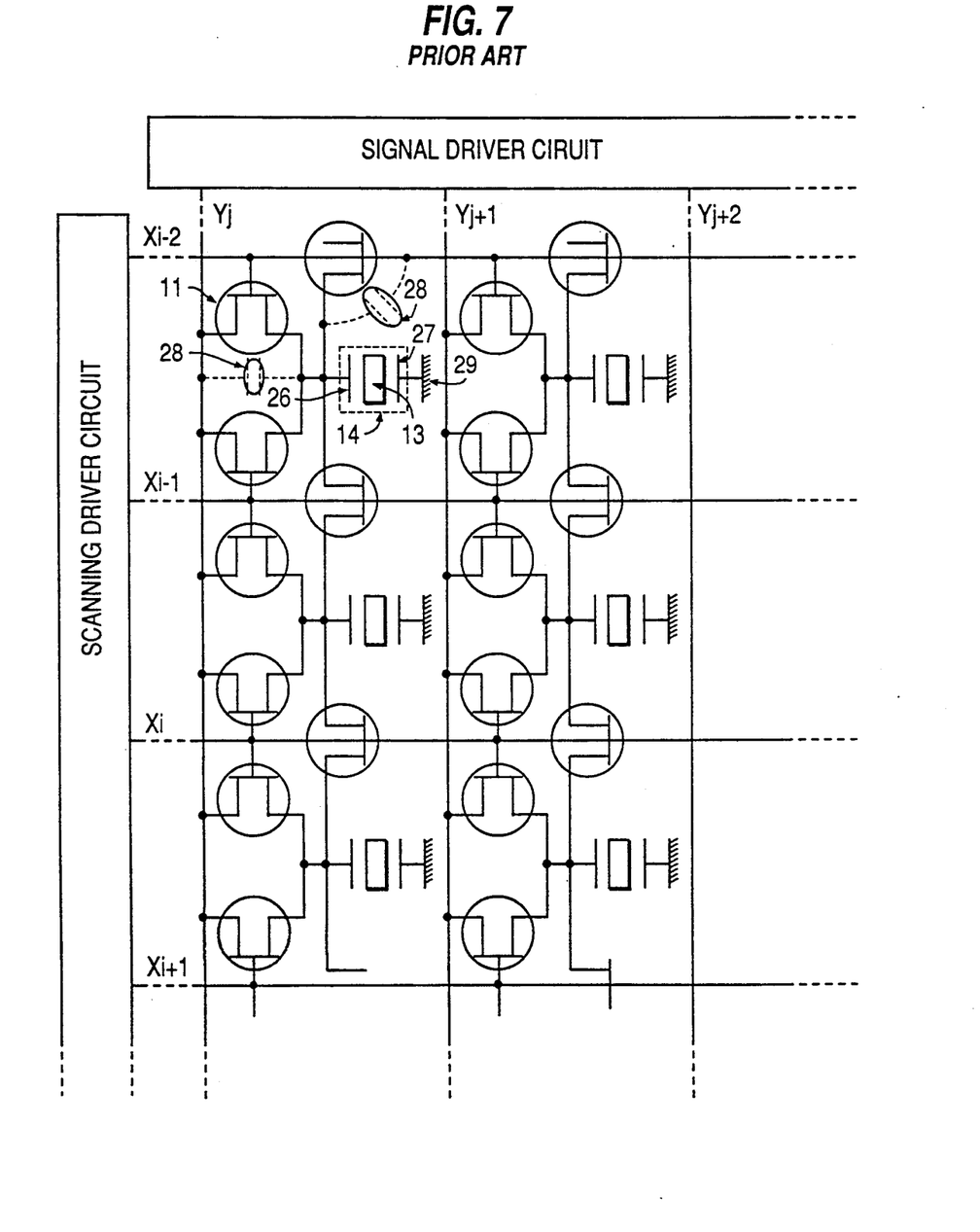
FIG. 7 is an equivalent circuit diagram of another prior art liquid crystal display device.

An improved TFT array has also been introduced in which even if some TFTs are defective, pixel defects (including line defects and point defects) will be minimized, as disclosed in Japanese Laid-open Patent Publication 61-243483 (1986). The improved TFT array is illustrated in FIG. 7 in which each pixel 14 incorporates a plurality of TFTs 11 so that even if one TFT is defective, the remaining TFTs can perform a normal action. However, when such a liquid crystal display device is used for display of alphabetic and numeric characters, the pixel capacitance has to be greater than a parasitic capacitance 28 for the purpose of temperature compensation or other compensation for signal noise and flicker effects. It is apparent that when the capacitance of each pixel 14 in the TFT array is adapted to be greater than the parasitic capacitance 28 of the TFT 11, no trouble arises. In practice, the pixel capacitance across a liquid crystal 13 is insufficient and noise pulses are inducted by a pixel potential via the parasitic capacitance 28 from the scanning line Xi (i=1 to M; M is the total number of the scanning lines) and the signal line Yj (j=1 to N; N is the total number of the signal lines). For a solution, a storage capacitor is arranged in parallel to the display pixel in order to increase the pixel capacitance relative to the parasitic capacitance 28 and thus minimize the noise effect. It is well known that the storage capacitors are formed in an array between corresponding pixel electrodes 26 and a common electrode 29. Although this arrangement is advantageous in the holding of signals, it will be disadvantageous in the cost of fabrication. More particularly, each storage capacitor in the TFT array is arranged by interposing an insulating layer between the pixel electrode 26 and the common electrode 29 and thus, requires an extra number of masking procedures during the production. As the result, a series of the masking procedures will cause the production cost to increase and incidentally, the frequency of production faults will be increased.

SUMMARY OF THE INVENTION

It is an object of the present invention, in view of the foregoing drawbacks, to provide a liquid crystal display device in which each disabled pixel associated with at least one defective TFT can produce an image segment which is equivalent in picture quality to that of a normal pixel. For the purpose, a TFT array, which comprises a plurality of scanning lines Xi (i=1 to M; M is the total number of the scanning lines), a plurality of signal lines Yj (j=1 to N; N is the total number of the signal lines), and a matrix of pixels, each pixel being disposed at the intersection of a scanning line and a signal line, is arranged in which each of the pixels is activated by the action of two or three TFTs and also, accompanied by a storage capacitor provided between its pixel electrode and the preceding scanning line (referred to the scanning line of the preceding row) selected before the current scanning line which is to be selected for energizing the pixel through the TFTs. Accordingly, there are provided two or three signal supply routes for each pixel and when an open circuit defect occurs in one of the TFTs, the corresponding pixel can be activated normally. In addition, the storage capacitor is arranged in parallel to the pixel so that the pixel capacitance can be increased for holding a signal voltage. Hence, the unwanted effect of another signal fed to an adjacent pixel, which is emphasized by the parasitic capacitance of the TFTs, will be minimized. Also, the storage capacitor is arranged between the scanning line of the preceding row and the pixel electrode so that it can be formed by a part of the insulating layer of the TFTs. As the result, the TFT array will be fabricated with no extra procedure during the production of the TFTs or more specifically, without the use of extra masking procedures.

DESCRIPTION OF THE PREFERRED EMBODIMENTS

According to the present invention, charging to each pixel coupled to one signal line and one scanning line is conducted not by a single TFT but rather by two or three TFTs which provide their respective charging paths for the input of signals. In addition, a storage capacitor is arranged between the pixel and its preceding scanning line. When any one of the two or two of the three TFTs of the pixel are found defective, they are separated from the pixel by e.g. laser cutting if they are a shortcircuit defect and left as they are if they are an open-circuit defect, while the remaining TFTs are left substantially connected. Accordingly, the feeding of signals to a pixel electrode can be guaranteed. Since the line or point defects are avoided, the pixel will be energized without failure. Also, when the parasitic capacitance varies and causes a punch-through voltage to change during actuation of an operable TFT, the storage capacitor coupled between the pixel and its preceding scanning line in parallel to the pixel capacitance can constantly maintain the pixel capacitance greater than the parasitic capacitance, thus minimizing unwanted effects caused by signal noise. As the result, the data of a normal signal will be supplied without deficiency. There is proposed a prior art in which for the addition of such a redundant path, an extra TFT is arranged in parallel to a corresponding pixel. In that case, it will be difficult to identify one defective TFT from more than one of the TFTs for correction using a laser device when a line or point defect has been detected. Also, another prior art arrangement is provided in which each pixel is associated with two scanning lines and incorporates two TFTs whose gate electrodes are coupled to the two scanning lines respectively. The disadvantage of this arrangement is that the pixel is sharply decreased in aperture.

One preferred embodiment of the present invention will now be described referring to the accompanying drawings.

Figure 1:
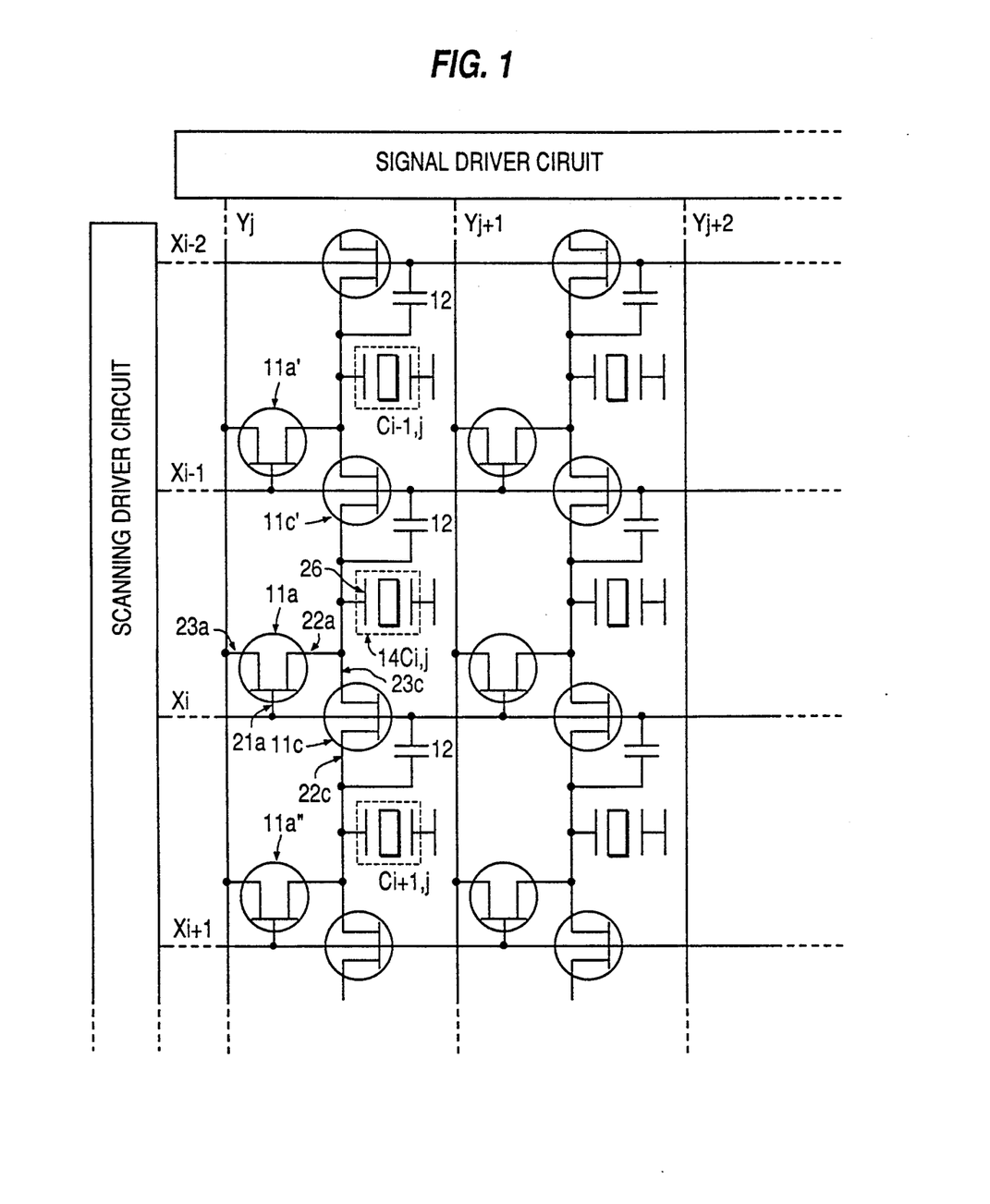
FIG. 1 is an equivalent circuit diagram of a TFT liquid crystal display device showing one embodiment in accordance with the present invention.

FIG. 1 illustrates an equivalent circuit of the array arrangement of a TFT liquid crystal display device according to a first embodiment of the present invention. In common, TFTs are composed of amorphous silicon, poly-crystalline silicon, and 2-6 semiconductor layers as shown in the cross sectional view of FIG. 6. The waveform of a signal fed from a scanning driver circuit to a scanning line X1 may be identical to that of a prior art shown in FIG. 4. Also, a driving method may be equal to that shown in FIG. 5 in which scanning is overlapped by activating two scanning lines at the same time.

Figure 5:
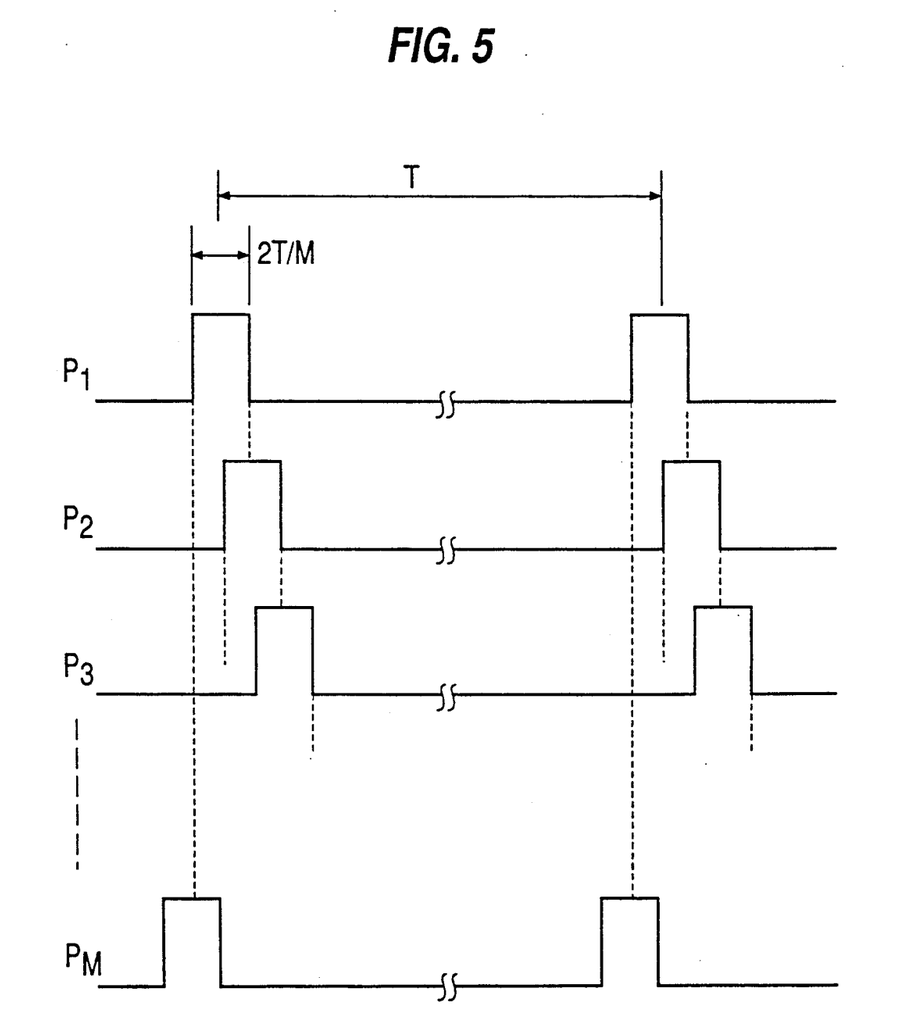
FIG. 5 is a waveform diagram of selective pulses used for selecting two consecutive scanning lines at the same time.

In FIG. 5, selective pulses P1, P2, P3, . . . , PM produced by a scanning driver circuit are supplied to the scanning lines X1, X2, X3, . . . , XM in such an order that P1 is supplied to X1, P2, to X2, P3 to X3, . . . , and PM to XM in a frame period T; a pulse width of each pulse supplied to the scanning lines is 2T/M, and each pulse is shifted so that a part of the pulse overlaps a part of the pulse of a previous scanning line. In this driving method, there is a period in which the two adjacent scanning lines are driven at the same time and all of the TFTs coupled to the two scanning lines are turned on. Then, signal voltages are supplied from a signal driver circuit to all the signal lines in synchronism. Each pixel 14 of the liquid crystal display device of the present invention, denoted by (Ci,j), is arranged at the intersection of one scanning line Xi (i=1 to M; M is the total number of the scanning lines) and one signal line Yj (j=1 to N; N is the total number of the signal lines) and activated through charging with the action of two TFTs 11a and 11c controlled by the scanning line Xi. The TFT 11a has a gate electrode 21a coupled to the scanning line Xi, a source electrode 23a coupled to the signal line Yj, and a drain electrode 22a coupled to a pixel electrode 26 of the pixel 14 (Ci,j). Also, the TFT 11c has a gate electrode 21c coupled to the scanning line Xi, a source electrode 23c to the pixel electrode 26 of the pixel 14 (Ci,j), and a drain electrode 22c to the pixel electrode of another pixel 14 (Ci+1,j) arranged in the succeeding or next row. In addition, a storage capacitor 12 formed of e.g. SiNx, TaOx, SiOx, or AlOx material sandwiched between the pixel electrode 26 and the preceding scanning line Xi-1 is arranged in parallel to the pixel 14 (Ci,j). In operation, the pixel 14 (Ci,j) draws a signal a across TFTs 11a' and 11c' from the signal line Yj upon receiving an instruction pulse at the timing of selecting the scanning line Xi−1. The signal a is a voltage which is substantially designated for application to the pixel 14 (Ci−1,j). When the scanning line Xi is selected at the following timing, the pixel 14 (Ci,j) receives another instruction pulse and draws a signal b across the TFT 11a from the signal line Yj. Then, the pixel 14 (Ci,j) remains activated by the signal b until the scanning line Xi−1 is selected at another frame. Accordingly, such normal actions of the pixel will never be interrupted by the presence of the TFT 11c.

In case that the TFT 11a is shortcircuited, its drain electrode 22a is disconnected from the pixel electrode 26 by means of e.g. laser cutting. However, it is left intact when the defect is attributed to open-circuit. At the time, the signal b of the signal line Yj is transmitted from the TFT 11c to the next pixel 14 (Ci+1,j) with the timing of selection of the scanning line Xi, thus causing a point defect on the pixel 14 (Ci,j). Even if the TFT 11c is defective, the pixel 14 (Ci,j) operates correctly and the pixel 14 (Ci+1,j) substantially receives a signal c from a TFT 11a'' thus operating normally. When the two adjacent scanning lines are simultaneously activated by two respective pulses shown in FIG. 5, the pixel 14 (Ci,j) draws a substantial signal unless both the TFTs 11a and 11c become defective. More specifically, when the two scanning lines Xi−1 and Xi are selected, the signal a is transmitted from the pixel 14 (Ci−1,j) to the pixel 14 (Ci,j) by way of two routes across the TFT 11a and across the two TFTs 11a' and 11c'. Then, when the two scanning lines Xi and Xi+1 are selected at the next timing, the signal b is transmitted to the pixel 14 (Ci,j) by way of two routes across the TFT 11a and across the two TFTs 11a'' and 11c. Accordingly, unless both of the two TFTs 11a and 11c become defective at once, the substantial signal can be kept supplied. Also, the storage capacitor 12 arranged in parallel to the pixel 14 (Ci,j) is interposed between the pixel electrode 26 and the scanning line Xi−1 so that unwanted effects of a parasitic capacitance developed by the TFTs 11a and 11c can be eliminated.

The foregoing assignment of signals are illustratively expressed in Tables 1 and 2.

TABLE 1

Sequential Activation of Prior Art (One scanning line drive)

| No. | | Pixel Ci − 1, j | Pixel Ci, j | Pixel Ci + 1, j | Remarks |
| --- | --- | --- | --- | --- | --- |
| 1 | Normal Action | →a | a → b | b → c | Normal |
| 2 | Fault on TFT11a | →a | a → leak | leak → c | No good |
| 3 | Fault on TFT11c | →a | a → b | →c | Normal |

TABLE 2

Sequential Activation of Two Scanning Lines

| No. | | Pixel Ci − 1, j | Pixel Ci, j | Pixel Ci + 1, j | Remarks |
| --- | --- | --- | --- | --- | --- |
| 1 | Normal Action | →a' → a | a' → a → b | a → b → c | Normal |
| 2 | Fault on TFT11a | →a' → a | a' → a → b | a → b → c | Normal |
| 3 | Fault on TFT11c | →a' → a | a' → a → b | b → c | Normal |

If the probability of occurrence of the TFT's defect is P, the occurrence of a pixel defect will be approximately P in the prior art. According to the present invention, no pixel defect is involved unless the two TFTs associated with one pixel become defective at the same time. Hence, the occurrence of a pixel defect is expressed as P*P. If P is of the order of 1 ppm then, P*P becomes a very small number. It is now understood that the yield of TFT array boards according to the present invention will be greatly increased.

The present invention provides a simple but improved arrangement of the TFT array which yields a higher operative reliability and thus, will be suited for practical use. Also, each storage capacitor is arranged between the pixel and its preceding scanning line so that it can be built in the TFT array without increasing the number of masking procedures. In practice, the storage capacitor is formed of an insulating layer which also serves as the gate insulator of a TFT, and sandwiched between a pixel electrode and a gate scanning line. As the result, no extra procedure is needed during the production and thus, the production cost will not be increased. The overall capacitance is also increased, thus enhancing the quality of a reproduced image.

Figure 2:
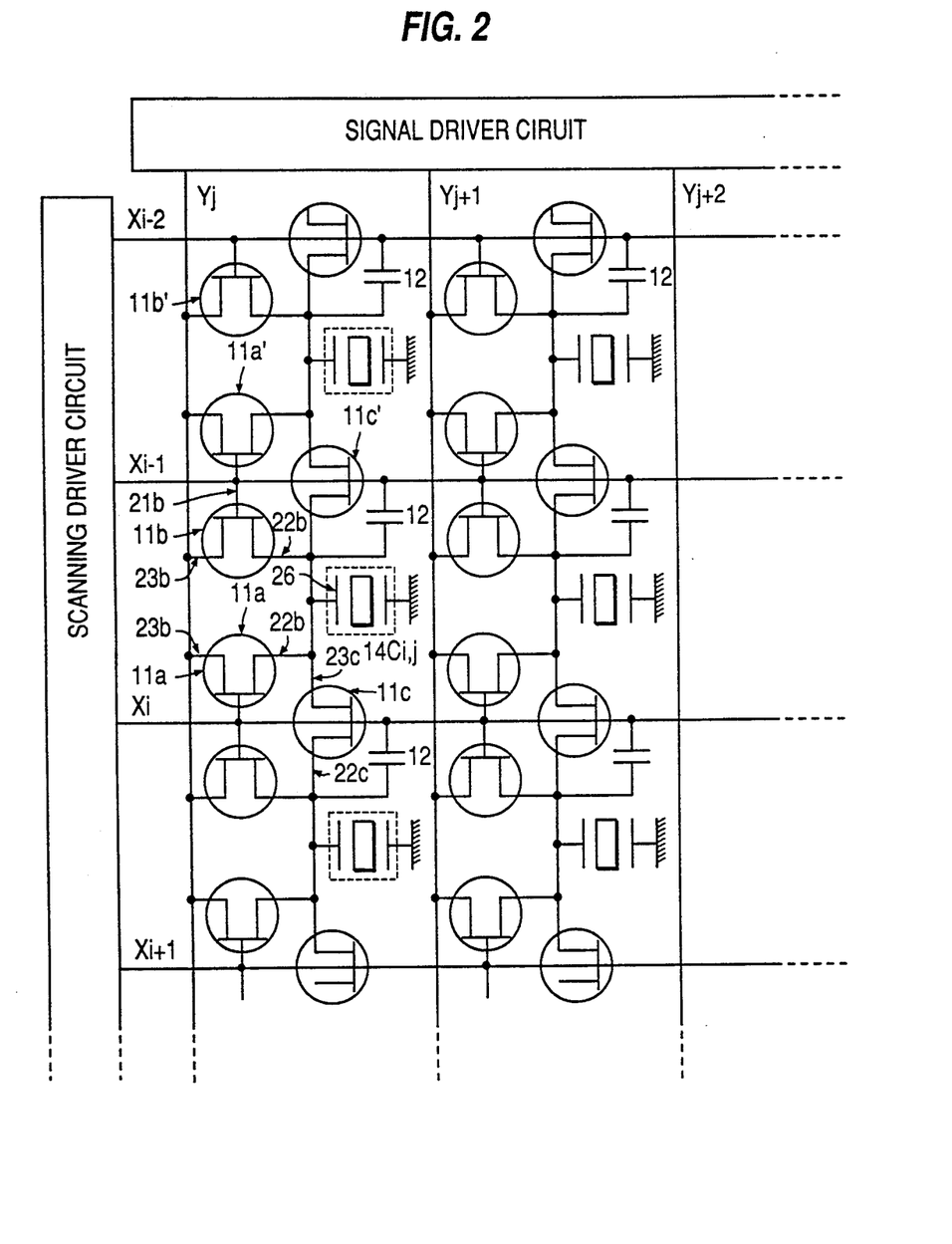
FIG. 2 is an equivalent circuit diagram of a TFT liquid crystal display device showing another embodiment in accordance with the present invention.

Another embodiment of the present invention will then be described in the form of a liquid crystal display device referring to the drawings. FIG. 2 is an equivalent circuit diagram of the liquid crystal display device which comprises a plurality of scanning lines Xi (i=1 to M; M is the total number of the scanning lines) coupled to a scanning driver circuit, a plurality of signal lines Yj (j=1 to N; N is the total number of the signal lines) coupled to a signal driver circuit, and a plurality of pixels 14 denoted by (Ci,j), each being associated with both one scanning line Xi and one signal line Yj. Each pixel 14 (Ci,j) is arranged for drawing a signal from the signal line Yj by the action of three TFTs 11a, 11b, and 11c controlled by the scanning line Xi. All the TFTs are coupled at the gate electrode to the scanning line Xi. Both the source electrodes 23a and 23b of the their respective TFTs 11a and 11b are coupled to the signal line Yj. The drain electrodes 22a and 22c of the their respective TFTs 11a and 11c are coupled to a pixel electrode 26 of the pixel 14 (Ci,j). Also, the source electrode 23c of the TFT 11c is coupled to the pixel electrode 26 of the pixel 14 (Ci,j). The drain electrode 22c of the TFT 11c is coupled to the pixel electrode of another pixel 14 (Ci+1,j) arranged in the succeeding or next row. In addition, a storage capacitor 12 formed of e.g. SiNx, TaOx, SiOx, or AlOx material is sandwiched between the pixel electrode 26 and the preceding scanning line Xi−1. In operation, such a series of signal pulses as shown in FIGS. 4 or 5 are supplied to the scanning lines respectively and synchronously, a signal voltage is transmitted from the signal driver circuit to each of the signal lines. The pixel 14 (Ci,j) draws a signal voltage via TFTs 11a' and 11c' from the signal line Yj at the timing of selecting the scanning line Xi−1. The signal a is a voltage substantially designated for application to the pixel 14 (Ci−1,j). When the scanning line Xi is selected at the following timing, the pixel 14 (Ci,j) receives another instruction pulse and draws a signal b across the TFT 11a from the signal line Yj. Then, the pixel 14 (Ci,j) remains activated by the signal b until the scanning line Xi−1 is selected in the next frame. Accordingly, such normal actions of the pixel will never be interrupted by the presence of the TFT 11b or 11c.

If the TFT 11a is shortcircuited, its drain electrode 22a is disconnected from the pixel electrode 26 of the pixel 14 (Ci,j) by means of e.g. laser cutting. However, it is left intact when the defect is attributed to an open-circuit. At the timing of selecting the scanning line Xi, the substantial signal b is fed from the signal line Yj across the TFTs 11b and 11c to the pixel 14 (Ci,j). The pixel 14 (Ci,j) will draw a punch-through voltage as a voltage difference unless the TFTs 11a, 11b, and 11c are equivalent to the parasitic capacitances 10a, 10b, and 10c. According to the present invention, the pixel 14 (Ci,j) is accompanied by the storage capacitor 12 so that the pixel capacitance remains greater than the total parasitic capacitance and can thus be operated normally without a deterioration in the picture quality.

The activation of two scanning lines similar to that in the previous embodiment having a pair of TFTs for each pixel, as shown in FIG. 5, with an overlapping relationship will further minimize any unwanted operational failure.

The foregoing assignment of input signals, similar to that in the previous embodiment having two TFTs for one pixel, is illustratively expressed in Tables 3 and 4.

TABLE 3

Sequential Activation of One Scanning Line

| No. | Pixel Ci − 1, j | Pixel Ci, j | Pixel Ci + 1, j | Remarks |
| --- | --- | --- | --- | --- |
| 1 | Normal | →a | a → b | b → c | Normal |

TABLE 3-continued

Sequential Activation of One Scanning Line

| No. | | Pixel Ci − 1, j | Pixel Ci, j | Pixel Ci + 1, j | Remarks |
|---|---|---|---|---|---|
| | Action | | | | |
| 2 | Fault on TFT11a | →a | a → b | b → c | Normal |
| 3 | Fault on TFT11c | →a | a → b | b → c | Normal |
| 4 | Fault on TFT11b | →a | a → b | b → c | Normal |
| 5 | Fault on TFTs11a, 11c | →a | a→ | b → c | No good |
| 6 | Fault on TFTs11a, 11b | →a | a → leak | leak → c | No good |
| 7 | Fault on TFTs11b, 11c | →a | a → b | →c | Normal |

TABLE 4

Sequential Activation of Two Scanning Lines

| No. | | Pixel Ci − 1, j | Pixel Ci, j | Pixel Ci + 1, j | Remarks |
|---|---|---|---|---|---|
| 1 | Normal Action | →a' → a | a' → a → b | a → b → c | For OA |
| 2 | Fault on TFT11a | →a' → a | a' → a → b | a → b → c | For OA |
| 3 | Fault on TFT11c | →a' → a | a' → a → b | a → b → c | For OA |
| 4 | Fault on TFT11b | →a' → a | a' → a → b | a → b → c | For OA |
| 5 | Fault on TFTs11a, 11c | →a' → a | a' → a | a → b → c | For AV |
| 6 | Fault on TFTs11a, 11b | →a' → a | a' → a → b | a → b → c | For OA |
| 7 | Fault on TFTs11b, 11c | →a' → a | a' → a → b | b → c | For OA |

In Table 4, the term OA represents "office automation" appropriated for display of alphabetic and numeral characters and the term AV represents "audio visual" appropriated for display of a TV image.

In case of No. 5 of Table 3, the pixel 14 (Ci,j) cannot draw another signal after receiving the signal a because both the TFTs 11a and 11c are defective. Accordingly, the capacitance of the storage capacitor 12 acts as a parasitic capacitance to the TFT 11b, thus causing the signal a to the pixel 14 (Ci,j) to be affected by a pulse for disabling the scanning line Xi−1. Also, in case of No. 6 of Table 3, the signal a fed across the TFT 11c to the pixel 14 (Ci,j) will leak off causing a pixel defect. However, as apparent from Table 4, the interruption with an adjacent pixel signal in the case of No. 5 will be lessened to a visually negligible level by simultaneous activation of the two scanning lines and the drawback in the case of No. 6 will not be perceived when a normal signal is supplied by the same simultaneous activation.

If the probability of the TFT's on a substrate becoming defective is P, the occurrence of a pixel defect will be approximately P in the prior art. According to the present invention, no pixel defect is involved unless all of the three TFTs associated with one pixel become defective at the same time. Hence, the occurrence of a pixel defect is expressed as P*P*P. If P is of the order of 1 ppm then, P*P*P becomes a very small number. It is now understood that the yield of TFT array according to the present invention will be greatly increased.

The present invention provides a simple but improved arrangement of the TFT array which yields a higher operative reliability and thus, will be suited for practical use with a liquid crystal display device for alphabetic and numeral display. Also, each storage capacitor is arranged between the pixel and its preceding scanning line so that it can be built into the TFT array without increasing the number of masking procedures. As the result, the picture quality in reproduction will be enhanced with no production cost increase.

What is claimed is:

1. A liquid crystal display device having an array of thin film transistors serving as switch elements for activating pixels, comprising:

a plurality of signal lines Yj for supplying signals, wherein j=1 to N and N is the total number of signal lines;

a plurality of scanning lines Xi for controlling the thin film transistors, wherein i−1 to M and M is the total number of scanning lines;

a matrix of pixels C(i,j), each pixel being disposed at an intersection of a scanning line Xi and signal line Yj;

each pixel C(i,j) of said matrix of pixels being provided with first and second thin film transistors controlled by the scanning line Xi, wherein source and drain electrodes of the first thin film transistor are respectively coupled to the signal line Yj and pixel electrode of the pixel C(i,j), and wherein gate, source and drain electrodes of the second thin film transistor are respectively coupled to the scanning line Xi, the pixel electrode of the pixel C(i,j) and a pixel electrode of an adjacent pixel (Ci+1,j) being arranged on the opposite side of the scanning line Xi with respect to the pixel C(i,j);

each pixel C(i,j) being accompanied by a storage capacitor formed of a portion of a gate insulating layer of a second thin film transistor of a previous pixel C(i−1,j) and sandwiched between its pixel electrode and a previous scanning line Xi−1; and a scanning driver circuit for activating two adjacent scanning lines at the same time by applying a scanning pulse to each scanning line Xi which is shifted such that a portion of the scanning pulse overlaps a scanning pulse applied to a previous scanning line Xi−1.

2. A liquid crystal display device having an array of thin film transistors serving as switch elements for activating pixels, comprising:

a plurality of signal lines Yj for supplying signals, wherein j=1 to N and N is the total number of signal lines;

a plurality of scanning lines Xi for controlling the thin film transistors, wherein i=1 to M and M is the total number of scanning lines;

a matrix of pixels C(i,j), each pixel being disposed at an intersection of a scanning line Xi and signal line Yj;

each pixel C(i,j) of said matrix of pixels being provided with first, second and third thin film transistors controlled by the scanning line Xi, wherein source and drain electrodes of the first thin film transistor are respectively coupled to the signal line Yj and a pixel electrode of the pixel C(i,j), and wherein gate, source and drain electrodes of the second thin film transistor are respectively coupled to the scanning line Xi, the pixel electrode of the pixel C(i,j) and a pixel electrode of an adjacent pixel (ci+1,j) being arranged on the opposite side of the scanning line Xi with respect to the pixel C(i,j), and wherein gate, source and drain electrodes of the third thin film transistor are respectively coupled to a previous scanning line $X_{i-1}$, the signal line $Y_j$ and the pixel electrode of the pixel C(i,j);

each pixel C(i,j) being accompanied by a storage capacitor formed of a portion of a gate insulating layer of a second thin film transistor of a previous pixel C(i−1,j) and sandwiched between its pixel electrode and a previous scanning line $X_{i-1}$; and a scanning driver circuit for activating two adjacent scanning lines at the same time by applying a scanning pulse to each scanning line $X_i$ which is shifted such that a portion of the scanning pulse overlaps a scanning pulse applied to a previous scanning line $X_{i-1}$.

* * * * *